US009703997B2

(12) United States Patent
Kai

(10) Patent No.: US 9,703,997 B2
(45) Date of Patent: Jul. 11, 2017

(54) RFID TAG AND RFID SYSTEM

(71) Applicant: FUJITSU LIMITED, Kawasaki-shi, Kanagawa (JP)

(72) Inventor: Manabu Kai, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 38 days.

(21) Appl. No.: 15/003,425

(22) Filed: Jan. 21, 2016

(65) Prior Publication Data

US 2016/0140368 A1    May 19, 2016

Related U.S. Application Data

(63) Continuation of application No. PCT/JP2013/070792, filed on Jul. 31, 2013.

(51) Int. Cl.
*G06K 7/10* (2006.01)
*H01Q 7/00* (2006.01)
(Continued)

(52) U.S. Cl.
CPC ... *G06K 7/10316* (2013.01); *G06K 19/07749* (2013.01); *G06K 19/07756* (2013.01);
(Continued)

(58) Field of Classification Search
CPC ......... G06K 7/10316; G06K 19/07749; G06K 19/07756; G06K 19/07767;
(Continued)

(56) References Cited

U.S. PATENT DOCUMENTS

2005/0197074 A1* 9/2005 Cullen ............ G06K 19/07718
455/90.3
2006/0220871 A1* 10/2006 Baba .................... G06K 19/073
340/572.7
(Continued)

FOREIGN PATENT DOCUMENTS

EP          2306588 A1    4/2011
JP       2007-272264      10/2007
(Continued)

OTHER PUBLICATIONS

EESR—Extended European Search Report mailed on Jun. 22, 2016 issued with respect to the corresponding European Patent Application No. 13890425.5.
(Continued)

*Primary Examiner* — George Bugg
*Assistant Examiner* — Thang Tran
(74) *Attorney, Agent, or Firm* — Fujitsu Patent Center

(57) ABSTRACT

An RFID tag includes a base part, a loop antenna around the base part including a first antenna element and a second antenna element, and a loop-length shorter than a wavelength of a resonant frequency, and an IC chip at a first surface side of the base part. The IC chip is connected between a first terminal disposed on a first end of the first antenna element and a second terminal disposed on a first end of the second antenna element. The loop antenna includes an overlapping part at a second surface side of the base part, and a capacitance of the overlapping part is adjusted such that a difference between an imaginary component of a first synthetic impedance and an imaginary component of a second synthetic impedance is less than or equal to a predetermined value.

13 Claims, 14 Drawing Sheets

(51) Int. Cl.
*G06K 19/077* (2006.01)
*H01Q 1/38* (2006.01)
*H01Q 1/22* (2006.01)

(52) U.S. Cl.
CPC . *G06K 19/07767* (2013.01); *G06K 19/07771* (2013.01); *G06K 19/07786* (2013.01); *G06K 19/07788* (2013.01); *H01Q 7/00* (2013.01); *H01Q 1/2225* (2013.01); *H01Q 1/38* (2013.01)

(58) Field of Classification Search
CPC ....... G06K 19/07771; G06K 19/07786; G06K 19/07788; H01Q 7/00; H01Q 1/2225; H01Q 1/38
USPC .............. 340/10.51, 10.1–10.6, 572.1–572.9
See application file for complete search history.

(56) References Cited

U.S. PATENT DOCUMENTS

| | | | | |
|---|---|---|---|---|
| 2007/0229276 A1* | 10/2007 | Yamagajo | ........ | G06K 19/07786 340/572.7 |
| 2008/0122710 A1* | 5/2008 | Kim | ...................... | H01Q 1/2208 343/742 |
| 2008/0316135 A1* | 12/2008 | Hilgers | .................... | H01Q 1/22 343/795 |
| 2010/0072287 A1* | 3/2010 | Kai | ...................... | H01Q 1/2208 235/492 |
| 2010/0127085 A1* | 5/2010 | Yamagajo | ........ | G06K 19/07749 235/492 |
| 2010/0271264 A1* | 10/2010 | Li | .......................... | H01Q 1/243 343/700 MS |
| 2011/0121080 A1* | 5/2011 | Kai | .................. | G06K 19/07749 235/488 |
| 2011/0253795 A1* | 10/2011 | Kato | ................ | G06K 19/07749 235/492 |
| 2012/0006904 A1* | 1/2012 | Kato | ................ | G06K 19/07749 235/492 |

FOREIGN PATENT DOCUMENTS

| | | |
|---|---|---|
| JP | 2011-109552 | 6/2011 |
| WO | 2006/021914 A1 | 3/2006 |
| WO | 2011/033172 A1 | 3/2011 |
| WO | 2011132701 | 10/2011 |

OTHER PUBLICATIONS

International Search Report, mailed in connection with PCT/JP2013/070792 and mailed Aug. 27, 2013 (2 pages).

* cited by examiner

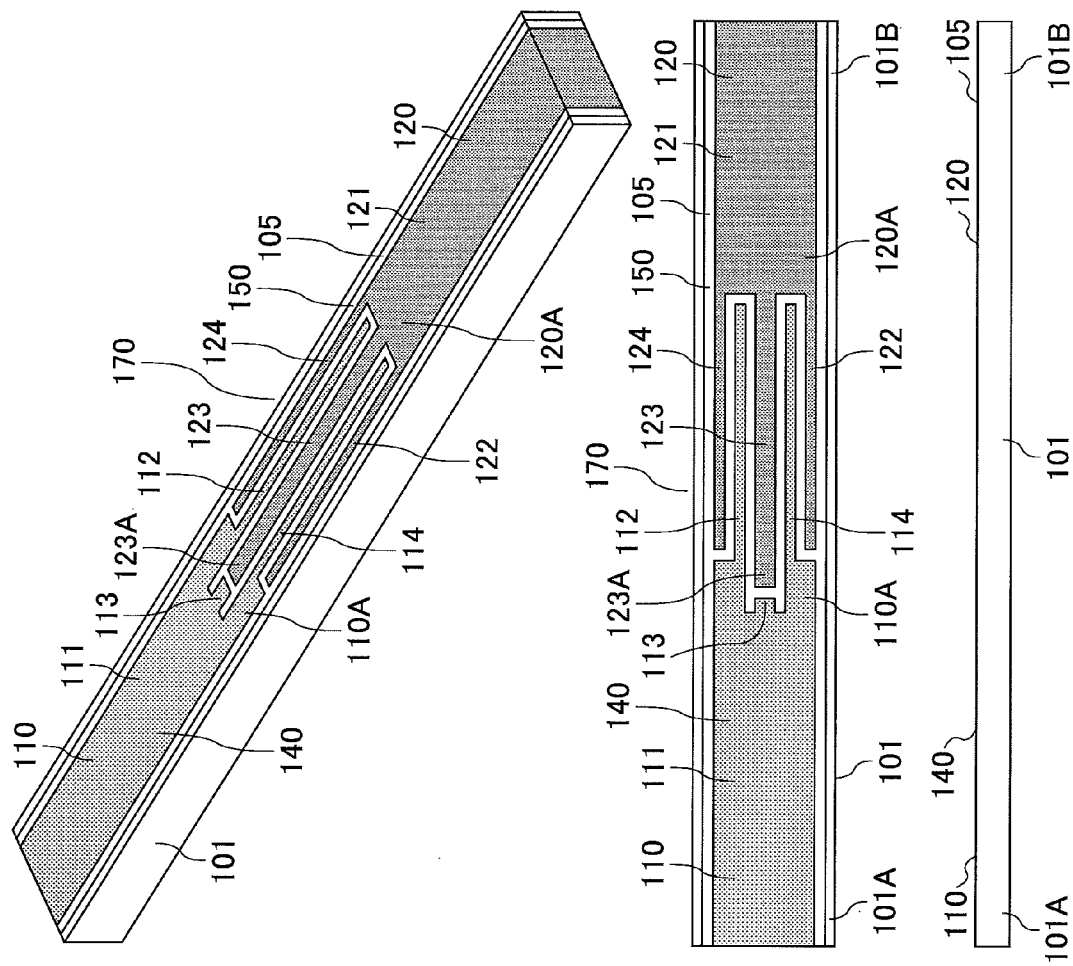

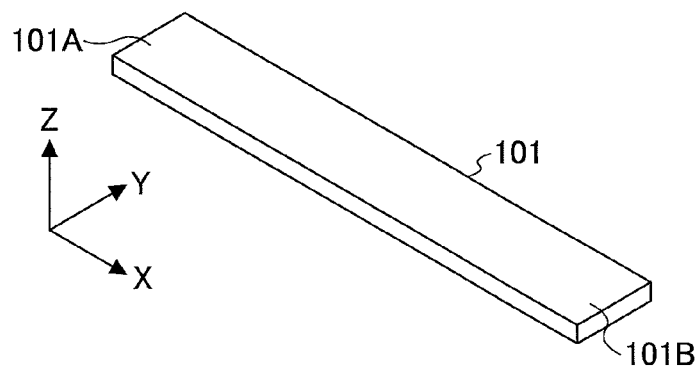
FIG.6A
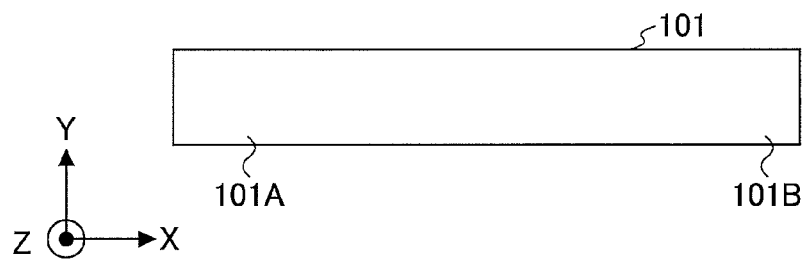
FIG.6B
FIG.7
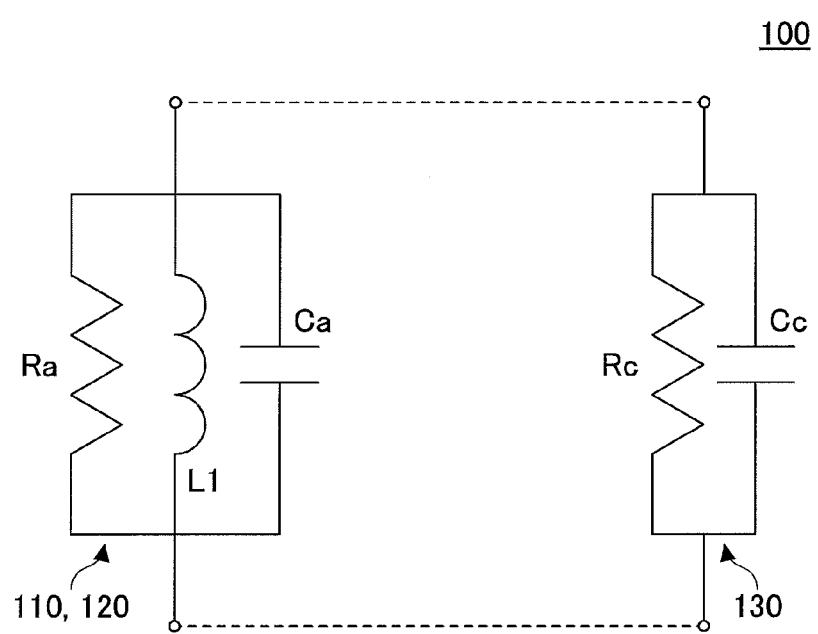

(D=2mm)

(D=1mm)

(D=0mm)

RFID TAG AND RFID SYSTEM

CROSS-REFERENCE TO RELATED APPLICATIONS

This application is a continuation application of International Application PCT/JP2013/070792 filed on Jul. 31, 2013 and designated the U.S., the entire contents of which are incorporated herein by reference.

FIELD

The disclosures discussed herein relate to an RFID (Radio Frequency Identification) tag and an RFID system.

BACKGROUND

Related art radio tags may include a radio communications circuit having first and second terminals coupled to a loop antenna, and a first conductor forming a first curved face provided with a first end part and a second end part opposite to the first end part. The first end part has a third terminal connected to the first terminal, and the second end part has a first area. Such radio communications tags may further include a second conductor forming a second curved face provided with a third end part including a fourth terminal connected to the second terminal. The second curved face has a fourth end part opposite to the third end part, and the fourth end part has a second area. The first area and the second area are overlapped in parallel to each other, and the first curved face and the second curved face form the loop antenna (e.g., Patent Document 1).

RELATED ART DOCUMENT

Patent Document

Patent Document 1: Japanese Laid-open Patent Publication No. 2011-109552

The related art radio tags demonstrate that the resonance frequency of the radio tag attached to a metallic member differs from that of the radio tag attached to a non-metallic member. This is because the metallic member to which the radio tag is attached may affect impedance of an antenna of the radio tag to change the impedance.

The radio tags that perform communications at their resonant frequencies may have longest communications distance ranges.

The related art radio tags capable of successfully perform communications at the resonant frequency when attached to metallic members may have insufficient communications distance ranges and may fail to perform communications at the same resonant frequency when they are attached to non-metallic members.

By contrast, the related art radio tags capable of successfully perform communications at the resonant frequency when attached to non-metallic members may have insufficient communications distance ranges and may fail to perform communications at the same resonant frequency when they are attached to metallic members.

SUMMARY

According to an aspect of embodiments, there is provided an RFID tag that includes a base part made of dielectric material and having plate-like shape; a loop antenna formed around the base part, the loop antenna including a first antenna element and a second antenna element, the loop antenna having a loop-length shorter than a wavelength of a resonant frequency; and an IC chip placed at a first surface side of the base part. The IC chip is connected between a first terminal disposed on a first end of the first antenna element and a second terminal disposed on a first end of the second antenna element. The loop antenna includes an overlapping part placed at a second surface side of the base part, a first end part disposed on a second end of the first antenna element and a second end part disposed on a second end of the second antenna element being overlapped at the overlapping part, the first end part and the second end part being insulated from each other. A capacitance of the overlapping part is adjusted such that a difference between an imaginary component of a first synthetic impedance and an imaginary component of a second synthetic impedance is less than or equal to a predetermined value. The imaginary component of the first synthetic impedance viewed from the first terminal and the second terminal being obtained based on an inductance of the loop antenna in a case where the second surface side of the base part is attached to a metallic member, a capacitance obtained between the loop antenna and the metallic member and the capacitance of the overlapping part, and the imaginary component of the second synthetic impedance viewed from the first terminal and the second terminal being obtained based on an inductance of the loop antenna in a case where the second surface side of the base part is attached to a non-metallic member and the capacitance of the overlapping part.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

BRIEF DESCRIPTION OF DRAWINGS

FIGS. 2A, 2B, and 2C are diagrams illustrating a configuration of the RFID tag 100 from which an IC chip 130 is removed;

FIGS. 6A and 6B are diagrams illustrating a base part 101;

FIG. 7 is a diagram illustrating an equivalent circuit of the RFID tag 100;

DESCRIPTION OF EMBODIMENTS

The following describes embodiments to which an RFID tag and an RFID system are applied.

First Embodiment

Figures 1A, 1B, 1C:
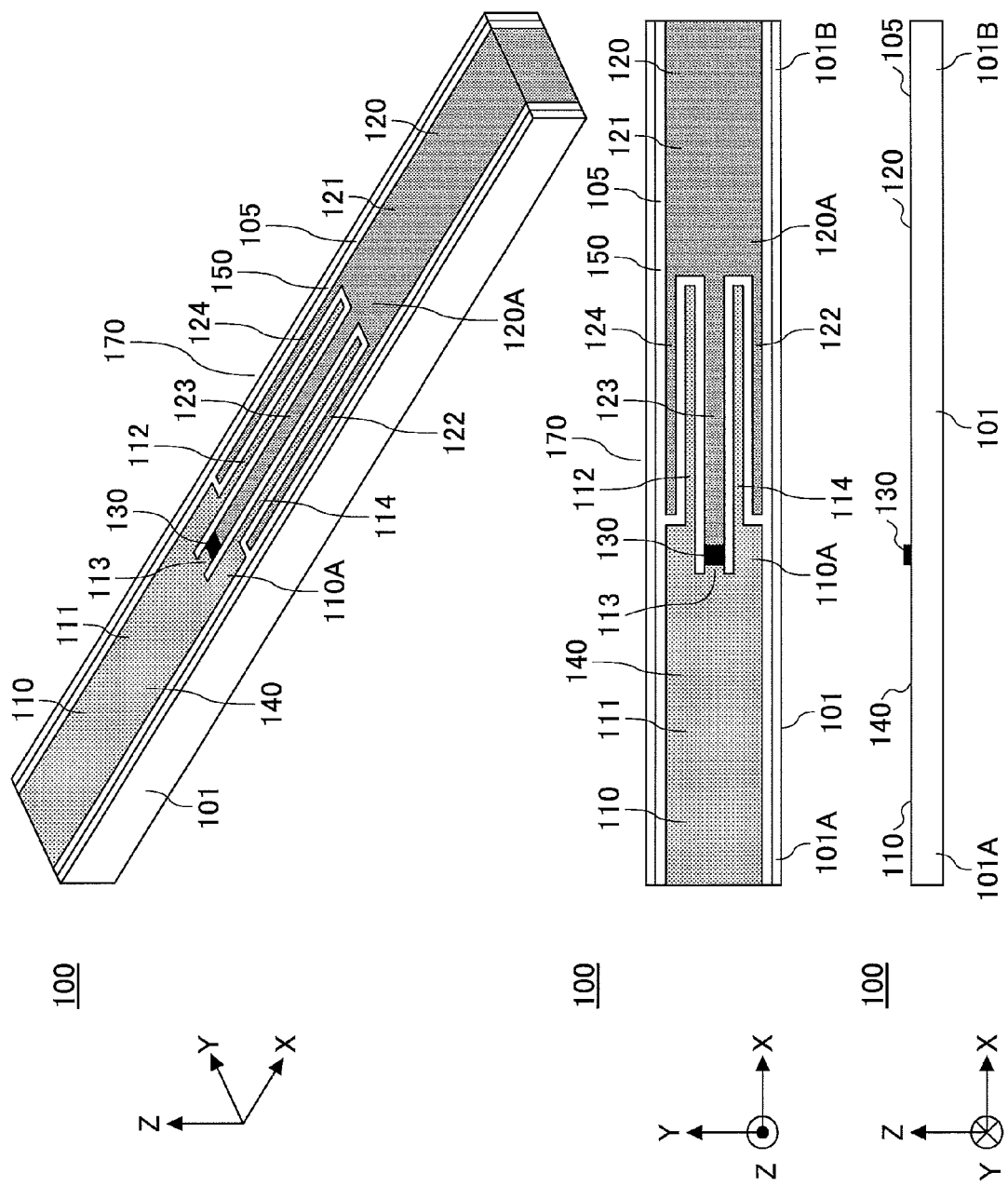
FIGS. 1A, 1B, and 1C are diagrams illustrating an RFID tag 100 of a first embodiment.

FIGS. 1A, 1B, and 1C are diagrams illustrating an RFID tag 100 of a first embodiment.

The RFID tag 100 of the first embodiment includes a base part 101, a sheet part 105, antenna elements 110 and 120, and an IC chip 130. Of these elements, the sheet part 105, the antenna elements 110 and 120 and the IC chip 130 constitute an inlay 150.

The following describes a configuration of the RFID tag 100 with further reference to FIGS. 2A to 6B in addition to FIGS. 1A to 1C. Note that FIGS. 1A to 6B employ common definitions of XYZ coordinate systems.

Figure 3A:
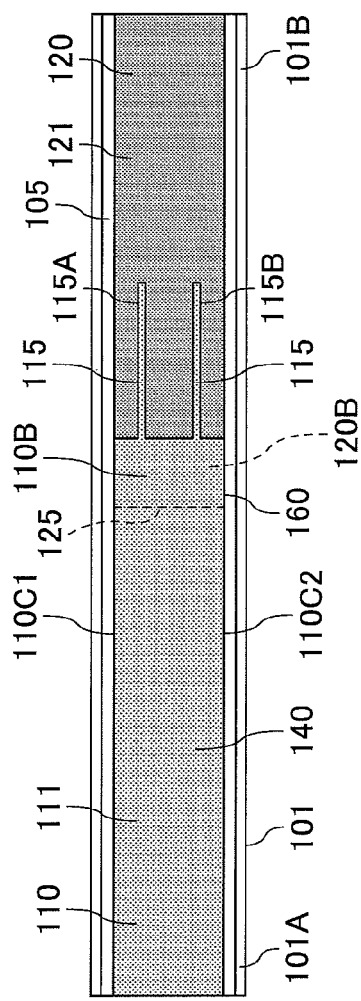
FIGS. 3A, 3B, and 3C are diagrams illustrating an attaching surface (a bottom face) of the RFID tag 100.
Figure 3B:
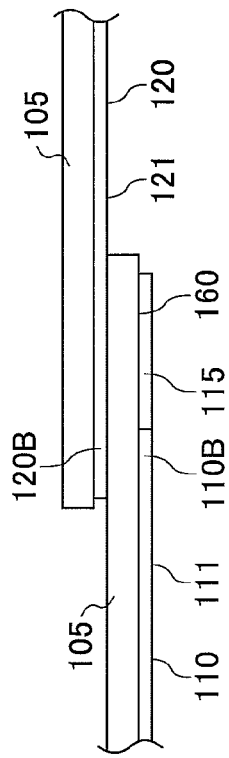
Figure 3C:
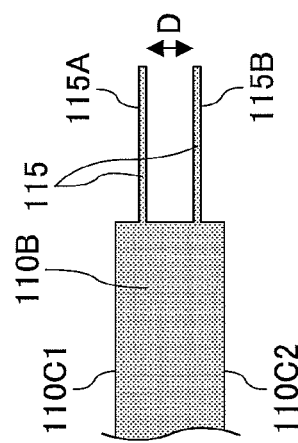
Figure 4:
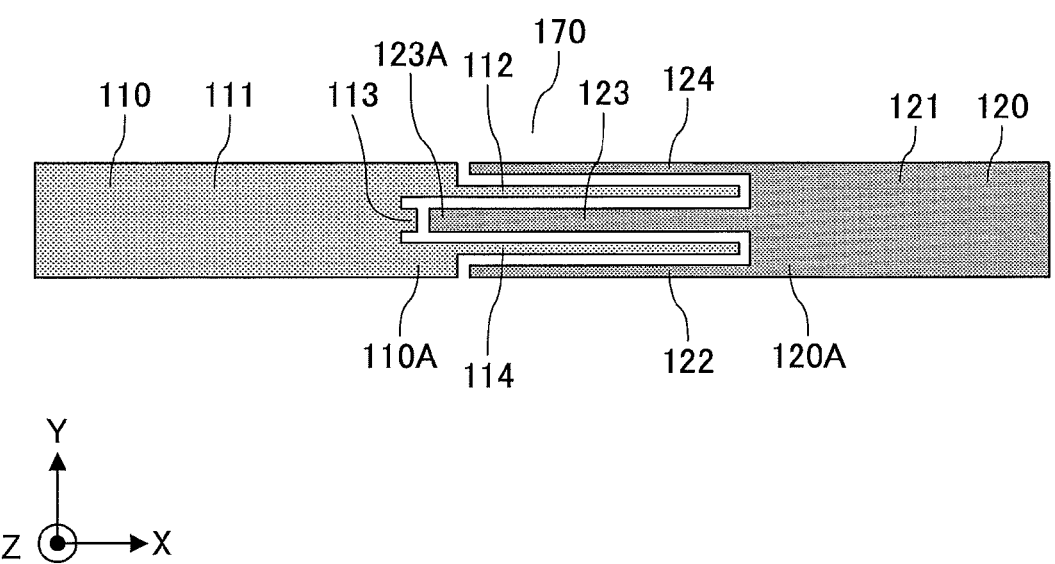
FIG. 4 is a diagram illustrating patterns on upper surfaces of antenna elements 110 and 120.
Figures 5A, 5B:
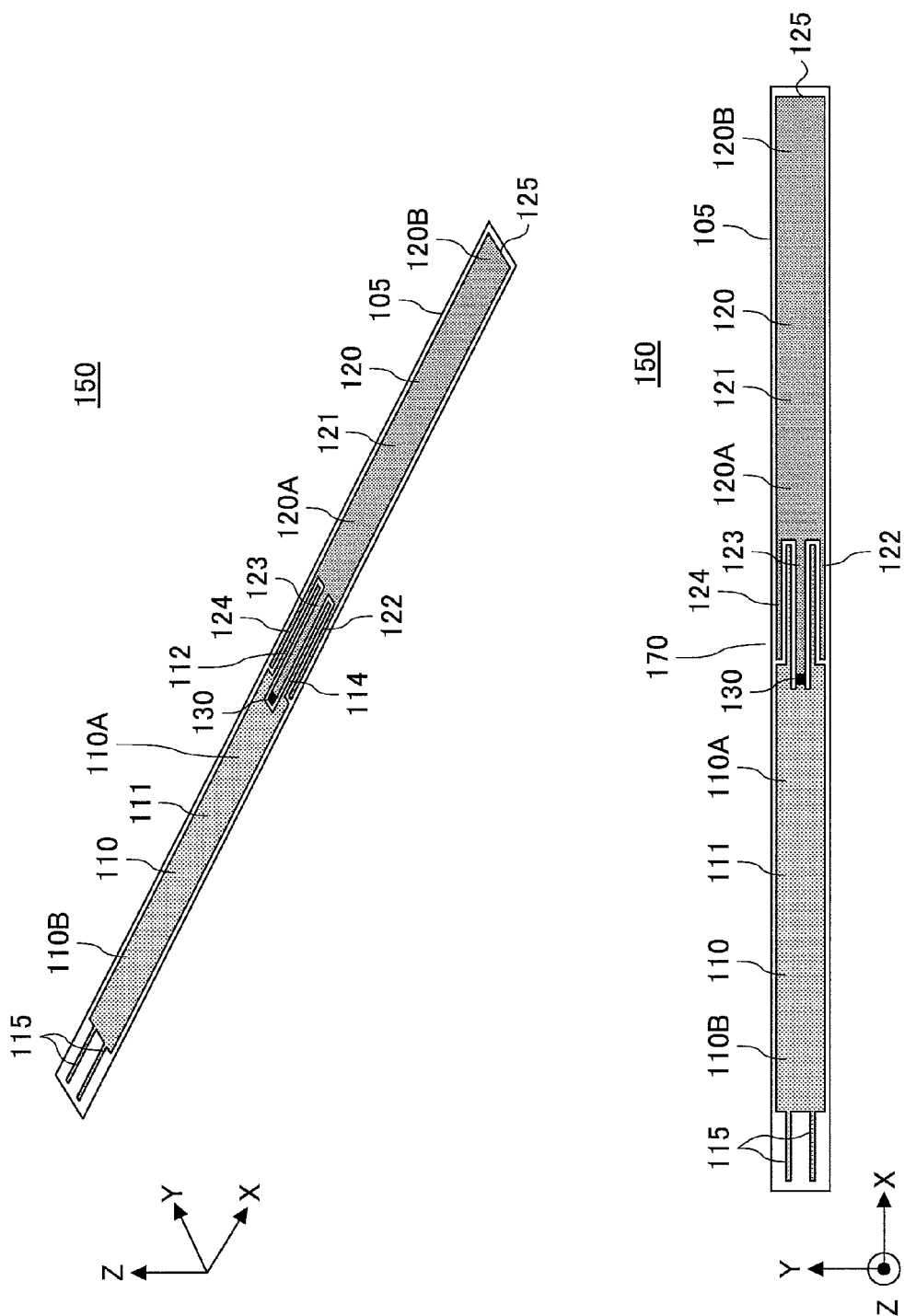
FIGS. 5A and 5B are diagrams illustrating an inlay 150.

FIGS. 2A, 2B, and 2C are diagrams illustrating a configuration of the RFID tag 100 from which an IC chip 130 is removed. FIGS. 3A, 3B, and 3C are diagrams illustrating an attaching face (a bottom face) of the RFID tag 100. FIG. 4 is a diagram illustrating an upper side pattern of antenna elements 110 and 120. FIGS. 5A and 5B are diagrams illustrating an inlay 150. FIGS. 6A and 6B are diagrams illustrating a base part 101.

In the following description, a surface of the thin sheet RFID tag 100 on which the IC chip 130 is mounted is called an "upper surface", and a surface opposite to the surface is called a "bottom face". The bottom face serves as an attaching surface via which the RFID tag 100 is attached to a metallic object or a non-metallic object.

Further, the following illustrates the RFID tag 100 having the resonant frequency of 865 MHz as an example. The RFID tag 100 of the first embodiment has optimized dimensions of the components, optimized inductance, and optimized capacitance to have the resonance frequency of 865 MHz. The dimensions of the components, the inductance, and the capacitance of the RFID tag 100 may be optimized in accordance with a desired resonant frequency in order to allow the RFID tag 100 to obtain a resonant frequency other than the resonant frequency of 865 MHz.

The base part 101 has a plate-like shaped (rectangular parallelepiped shaped) member as illustrated in FIGS. 1A to 6B. The base part 101 may be made of any dielectric member such as ABS resin, PET (polyethylene terephthalate) resin, polycarbonate resin, and PVC (polyvinyl chloride) resin.

As illustrated in FIGS. 1A to 1C, the inlay 150 (see FIGS. 5A and 5B) is wrapped around the base part 101 in a longitudinal direction (X-axis direction). The base part 101 has a length of approximately 52 mm in the X-axis direction, a width of approximately 7 mm in the Y-axis direction, and a thickness of approximately 2 mm in the Z-axis direction.

In this example, two ends of the base part 101 are called an end part 101A and an end part 101B.

The sheet part 105 is a film having a rectangular shape in a plan view, and antenna elements 110 and 120 are formed on a first surface of the sheet part 105, as illustrated in FIGS. 5A and 5B. The sheet part 105 is an example of a sheet member.

The sheet part 105 may be a PET film or a film member made of PET resin or paper. The sheet part 105 illustrated in FIGS. 5A and 5B has a length of approximately 120 mm in the X-axis direction, a width of approximately 6 mm in the Y-axis direction, and a thickness of approximately 0.1 mm in the Z-axis direction.

The sheet part 105 has the antenna elements 110 and 120 on the first surface of the sheet part 105, and further has the IC chip 130 mounted on the first surface of the sheet part 105. The sheet part 105 is wrapped around the base part 101 in a state where the antenna elements 110 and 120 are formed on the first surface and the IC chip 130 is mounted on the first surface. The sheet part 105 provided with the complete inlay 150 (see FIGS. 5A and 5B) is wrapped around the base part 101, and attached to the base part 101 with adhesive.

The antenna element 110 is, as illustrated in FIGS. 5A and 5B, formed within approximately half the area in the longitudinal direction of the first surface of the sheet part 105. The antenna element 110 is an example of a first antenna element.

The antenna element 110 includes, as illustrated in FIGS. 1A to 2B, FIG. 4, and FIGS. 5A and 5B, an element 111, a projection part 112, a terminal 113, a projection part 114, and adjusting parts 115 (see FIGS. 5A and 5B). The antenna element 110 constitutes an antenna element 120 and a loop antenna 140.

The antenna element 110 has two ends; the first end is disposed on an upper surface of the base part 101 and is connected to the IC chip 130, and the second end is disposed on a lower surface of the base part 101. The first end of the antenna element 110 is called an "end part 110A" and the second end of the antenna element 110 is called an "end part 110B". The end part 110B is an example of a first end part.

The antenna element 110 may be made by screen printing silver paste. Note that the antenna element 110 may be made of any metal, and the antenna element 110 may thus be made of aluminum or copper.

The element 111 serves as a radiation part having a rectangular shape in a plan view, and has a projection part 112, a terminal 113, and a projection part 114 connected to the end part 110A, and also has adjusting parts 115 connected to the end part 110B. The element 111 is placed from the end part 110A side at the upper surface of the base part 101 toward the end part 110B located at the lower surface (the bottom face), and bent at the end part 101A of the base part 101.

The element 111 overlaps the element 121 at the end part 110B, as illustrated in FIGS. 3A to 3C. Specifically, the end part 110B of the antenna element 110 overlaps the end part 120B of the antenna element 120. The adjusting parts 115 connected to the end part 110B also overlap the end part 120B.

The end part 110B and the adjusting parts 115 that overlap the end part 120 in a plan view constitute an overlapping part

160. In the overlapping part 160, the end part 110B and the adjusting parts 115 are insulated from the end part 120B via the sheet part 105.

At the end part 110A side of the antenna element 110, the projection parts 112 and 114 extend from the element 111 in a longitudinal direction of the RFID tag 100. The projection parts 112 and 114 are formed at a position axially symmetric to the central axis along the longitudinal direction of the RFID 100.

The width (the width in Y-axis direction) of the projection part 112 is equal to the width of the projection part 114, and the projection parts 112 and 114 have uniform widths (the width in Y-axis direction) from their respective parts connected to the element 111 to their respective ends in a positive X-axis direction. The projection parts 112 and 114 are disposed in respective gaps between the projection parts 122, 123, and 124 of the antenna element 120 to form a meander structure in a plan view.

The projection parts 112 and 114, the terminal 113, and the projection parts 122, 123 and 124 constitute an interdigital part 170. The interdigital part 170 serves as a capacitor having a predetermined capacitance. The interdigital part 170 may be treated as a capacitor coupled in parallel to the loop antenna 140 constituted of the antenna elements 110 and 120.

Note that optimal values may be applied to the dimensions of the projection parts 112 and 114, the terminal 113, and the projection parts 122, 123 and 124 to apply a desired optimal value to the capacitance of the interdigital part 170.

At the end part 110A side of the antenna element 110, the terminal 113 extends from the element 111 in a positive X-axis direction along a longitudinal direction to form the projections. The terminal 113 is an example of a first terminal.

The terminal 113 has a uniform width (the width in Y-axis direction) from its side connected to the element 111 to its end in a positive X-axis direction. The width of the terminal 113 is approximately twice the respective widths of the projection parts 112 and 114.

Since electric current flows through the terminal 113 during the RFID tag communications, the wider terminal 113 may be preferred to reduce the resistance of the terminal 113. The RFID tag 100 of the first embodiment has the terminal 113 that is wider than the respective projection parts 112 and 114 within the limited width in Y-axis direction of the RFID tag 100. The width of the terminal 113 is equal to the width of the projection part 123 coupled to the terminal 113 via the IC chip 130.

The terminal 113 is positioned between the projection parts 112 and 114. The terminal 113 is, as illustrated in FIGS. 1A to 1C, connected to the IC chip 130.

The terminal 113 before being connected to the IC chip 130 is, as illustrated in FIGS. 2A to 2C, and FIG. 4, formed to have a space between the terminal 113 and the terminal 123A at the end of the projection part 123 in the X-axis direction. The IC chip 130 has two terminals one of which may be connected to the terminal 113 by solder or the like.

The adjusting parts 115 are, as illustrated in FIGS. 3A to 5B, two thin patterns extending from the element 111 in a longitudinal direction to form projections at the end part 110B side. The adjusting parts 115 are an example of a first projection part.

The adjusting parts 115 overlap the end part 120B of the antenna element 120. The adjusting parts 115 are insulated from the end part 120B via the sheet part 105. The adjusting parts 115 are included in the overlapping part 160.

The adjusting parts 115 are disposed to adjust impedance of the loop antenna 140 composed of the antenna elements 110 and 120. The impedance of the loop antenna 140 may, for example, be controlled by adjusting respective lengths of the adjusting parts 115 in the X-axis direction, widths of the adjusting parts 115 in the Y-axis direction adjusting parts 115, heights of the adjusting parts 115 in the Z-axis direction, and a distance D between the two adjusting parts 115 illustrated in FIG. 3C.

Note that as illustrated in FIG. 3A, an edge 115A of the adjusting part 115 residing in the positive Y-axis direction is slightly offset toward the negative Y-axis direction (toward the center in the width direction of the antenna element 110) from an edge 110C1 residing in the Y-axis position direction of the antenna element 110.

Similarly, an edge 115B of the adjusting part 115 residing in the negative Y-axis direction is slightly offset toward the positive Y-axis direction (toward the center in the width direction of the antenna element 110) from an edge 110C2 residing in the negative Y-axis direction of the antenna element 110.

The adjusting parts 115 are disposed as described above to control the end part 110B of the antenna element 110 that has been offset from the end part 120B of the antenna element 120 in the Y-axis direction to reliably overlap the end part 120B when the sheet part 105 of the inlay 150 (see FIGS. 5A and 5B) is wrapped around the base part 101 and adhered to the base part 101. That is, the adjusting parts 115 are disposed in the above arrangement in order to prevent the end parts 120A and 120B from failing to overlap each other. The adjusting parts 115 that have failed to overlap the end part 120B may cause the overlapping part 160 to obtain unintended capacitance, leading to shifting of the resonant frequencies.

To avoid this shifting, the edge 115A is offset from the edge 110C1 in the negative Y-axis direction (toward the center in the width direction of the antenna element 110), and the edge 115B is offset from the edge 110C2 in the positive Y-axis direction (toward the center in the width direction of the antenna element 110).

The antenna element 120 is, as illustrated in FIGS. 5A and 5B, formed within approximately half the area in the longitudinal direction of the first surface of the sheet part 105. The antenna element 120 is an example of a second antenna element.

The antenna element 120 includes, as illustrated in FIGS. 1A to 2B, FIG. 4, and FIGS. 5A and 5B, an element 121, projection parts 122, 123, and 124. The antenna element 120 forms the antenna element 120 and the loop antenna 140.

The antenna element 120 has two ends; the first end is disposed on the upper surface of the base part 101 and is connected to the IC chip 130, and the second end is disposed on the lower surface of the base part 101. The first end of the antenna element 120 is called an end part 120A and the second end of the antenna element 120 is called an end part 120B. The end part 120B is an example of a second end part.

The antenna element 120 may be made by screen printing silver paste. Note that the antenna element 120 may be made of any metal, and may thus be made of aluminum or copper.

The element 121 serves as a radiation part having a rectangular shape in a plan view, and has projection parts 122, 123, and 124 connected to the end part 120A of the antenna element 120, and also has an edge 125 in the end part 120B in parallel with the Y-axis direction. The element 121 is formed from the end part 120A side at the upper surface of the base part 101 toward the end part 120B located at the lower surface (bottom face), and bent at the end part 101B of the base part 101.

The element 121 overlaps the element 111 on the end part 120B side, as illustrated in FIGS. 3A to 3C. Specifically, the end part 120B of the antenna element 120 overlaps the end part 110B of the antenna element 110 and the adjusting parts 115 to form the overlapping part 160. In the overlapping part 160, the end part 110B and the adjusting parts 115 are insulated from the end part 120B via the sheet part 105.

On the end part 120A side of the antenna element 120, the projection parts 122, 123 and 124 extend from the element 121 in a longitudinal direction of the RFID tag 100. The projection parts 122 and 124 are formed at a position axially symmetric to the central axis along the longitudinal direction of the RFID 100.

The projection parts 122 and 124 extend from the element 121 along edges in the negative X-axis direction at two ends in the width direction (Y-axis direction) of the antenna element 120. The width (the width in Y-axis direction) of the projection part 122 is equal to the width (the width in Y-axis direction) of the projection part 124, and the projection parts 121 and 124 have uniform widths (the width in Y-axis direction) from their respective sides connected to the element 121 to their respective ends in the negative X-axis direction (the width in Y-axis direction).

The projection part 12 is located between the projection parts 122 and 124, and extends in the negative X-axis direction of the central axis along the longitudinal direction of the RFID 100. The terminal 123A (see FIGS. 2A to 2C and FIG. 4) is formed at the end of the projection part 123. The terminal 123A is, as illustrated in FIGS. 1A to 1C, connected to the IC chip 130.

The terminal 123A before being connected to the IC chip 130 is, as illustrated in FIGS. 2A to 2C, and FIG. 4, formed to include a space from the terminal 113 in the X-axis direction. The terminal 123A is an example of a second terminal. The IC chip 130 has two terminals one of which may be connected to the terminal 123A by solder or the like.

The projection part 123 has a uniform width (the width in the Y-axis direction) from the part connected to the element 121 toward the terminal 123A at the end of the projection part 123. The width of the projection part 123 is approximately twice the respective widths of the projection parts 122 and 124.

Since electric current flows through the projection part 123 during the RFID tag communications, the wider projection part 123 may be preferred to reduce the resistance of the projection part 123. The RFID tag 100 of the first embodiment has the projection part 123 that is wider than the respective projection parts 122 and 124 within the limited width in Y-axis direction of the RFID tag 100. The width of the projection part 123 is equal to the width of the terminal 113 coupled to the projection part 123 via the IC chip 130.

The projection parts 112, 114, and the terminal 113 are disposed in respective gaps between the projection parts 122, 123, and 124 of the antenna element 110 to form a meander structure in a plan view.

The projection parts 122, 123 and 124, the projection parts 112 and 114, and the terminal 113 form the interdigital part 170.

The IC chip 130 has two terminals mounted on the surface of the sheet part 105. The two terminals of the IC chip 130 are coupled to the respective terminals 113 and 123A by solder or the like. The IC chip 130 is electrically coupled to the antenna elements 110 and 120, and stores data representing a unique ID in an internal memory chip.

When the IC chip 130 receives reading signals at an RF (radio frequency) bandwidth from a reader-writer for the RFID tag 100 via the antenna elements 110 and 120, the IC chip 130 activates by electric power of the received signals to generate data representing the ID via the antenna elements 110 and 120. The reader-writer may thus be able to read an ID of the RFID tag 100.

The overlapping part 160 indicates, as illustrated in FIGS. 3A to 3C, a part in which the end part 110B of the antenna element 110 overlaps the end part 120B of the antenna element 120. The overlapping part 160 is disposed to adjust the resonant frequency of the RFID tag 100. The capacitance of the overlapping part 160 may be determined based on an overlapped area between the end parts 110B and 120B, and a distance between the end parts 110B and 120B.

Further, the overlapping part 160 further includes a part overlapping the end parts 110A and 120A. The RFID tag 100 illustrated in FIG. 1A to 5B includes a part where the overlapping part 160 overlaps the interdigital part 170. The overlapping part 160 that overlaps the interdigital part 170 in a Z-axis direction may also acquire capacitance between the overlapping part 160 and the interdigital part 170.

Note that this example describes a configuration of the overlapping part 160 that overlaps the end parts 110A and 120A. Specifically, the configuration indicates that the end parts 110A and 120A overlap the end parts 110B and 120B, and the adjusting parts 115.

However, the overlapping part 160 may include any overlapping part of surfaces and rear-surfaces of the antenna elements 110 and 120 in a plan view. The overlapping part 160 may be formed only of the end part 110A and the end part 120B, or may be formed only of the end part 120A and the end part 110B.

The interdigital part 170 is disposed in a meander structure in a plan view. The interdigital part 170 includes the projection parts 112 and 114, the terminal 113, and the projection parts 122, 213 and 124. The interdigital part 170 is disposed to acquire capacitance generated by arranging the projection parts 112 and 114, the terminal 113, and the projection parts 122, 123 and 124 close to one another to control the resonant frequency of the loop antenna 140 of the RFID tag 100.

The interdigital part 170 is disposed to bridge between the antenna elements 110 and 120. The end part 110A includes a part of the interdigital part 170 formed on the antenna element 110. The end part 120A includes a part of the interdigital part 170 formed on the antenna element 120.

Next, a detailed description is given of respective functional configurations of the terminal 100 with reference to FIG. 7.

FIG. 7 is a diagram illustrating an equivalent circuit of the RFID tag 100.

The loop antenna 140 composed of the antenna elements 110 and 120 may be represented by a resistor Ra and an inductor L1. In the RFID tag 100 of the first embodiment, the loop antenna 140 is provided with the overlapping part 160 and the interdigital part 170, and a capacitor Ca is connected in parallel to the resistor Ra and the inductor L1 as illustrated in FIG. 7. The capacitor Ca represents one capacitor, which is a combination of the overlapping part 160 and the interdigital part 170.

The IC chip 130 of the RFID tag 100 may be represented by a resistor Rc and a capacitor Cc.

The loop antenna 140 includes a resistance component, an inductance component, and a capacitance component, and the IC chip 130 may be represented by the resistance component and the capacitance component.

Note that the resistor Ra has a resistance Ra, the inductor L1 has inductance L1, and the capacitor Ca has a capacitance Ca. The resistor Rc has a resistance Rc, and the capacitor Cc has a capacitance Cc.

Rc may be approximately 2000Ω, and Cc may be approximately 1.0 pF. The above values are average values obtained by a general IC chip.

The RFID tag 100 is configured to perform communications by causing the equivalent circuit illustrated in FIG. 7 to generate resonance. The current generated by the resonance flows through the IC chip 130 and the antenna elements 110 and 120 when the RFID tag 100 receives reading signals and transmits data representing the ID.

The resonant frequency of the resonant current may be determined based mainly on the capacitance of the IC chip 130, the inductance of the antenna elements 110 and 120, the capacitance of the overlapping part 160, and the capacitance of the interdigital part 170.

The resonant frequency of the RFID tag 100 may be obtained by the following general formula (1).

$$f = \frac{1}{2\pi\sqrt{LC}} \quad (1)$$

In the general formula (1) applied to the RFID tag 100, L corresponds to the inductance L1 of the antenna elements 110 and 120, and C corresponds to a capacitance obtained by combining the capacitance Cc of the IC chip 130 and the capacitance Ca of the overlapping part 160 and the interdigital part 170.

The resonant frequency of the RFID tag 100 is not determined based on the loop antenna 140 (the antenna elements 110 and 120) alone, but is determined based on the loop antenna 140 (the antenna elements 110 and 120), the overlapping part 160, the interdigital part 170, and the IC chip 130.

In this respect, the loop antenna 140 in the RFID tag 100 differs from a so-called loop antenna that generates resonance by applying a loop length to 1 wavelength at the resonant frequency.

The resonant frequency of the resonant current in the RFID tag 100 of the first embodiment is the frequency at which the RFID tag 100 performs communications (a communications frequency). The resonant frequency of the resonant current in the RFID tag 100 may be set at 865 MHz. The loop length of the loop antenna 140 constituted of the antenna elements 110 and 120 may be approximately 110 mm, which is shorter than the wavelength at the resonant frequency.

For example, the wavelength at the resonant frequency of 865 MHz is approximately 348.6 mm; and the loop length of the loop antenna 140 of the RFID tag 100 is approximately 110 mm.

The loop length of the loop antenna 140 is shorter than 1 wavelength at the resonant frequency, indicating that the loop antenna 140 differs from the so-called loop antenna applying the loop length to 1 wavelength at the resonant frequency. The antenna elements 110 and 120 forming the loop antenna 140 may serve as an inductor.

The length (loop length) of a combination of the lengths of the antenna elements 110 and 120 is relatively short as described above, and the inductance of the antenna elements 110 and 120 is proportional to the loop length. Hence, the inductance of the loop antenna 140 may be relatively small. The loop antenna 140 of the RFID tag 100 includes the overlapping part 160 and the interdigital part 170 to adjust the resonant frequency to compensate for such small inductance.

Note that the impedance of the antenna, which is formed by adding the overlapping part 160 and the interdigital part 170 to the antenna 140 constituted of the antenna elements 110 and 120, may be determined based on the resistance (Ra) of the resistor Ra, the inductance (L1) of the inductor L1, and the capacitance (Ca) of the capacitor Ca illustrated in FIG. 7.

Further, the impedance of the IC chip 130 may be determined based on the resistance (Rc) of the resistor Rc, and the capacitance (Cc) of the capacitor Cc.

To acquire a good impedance match between the loop antenna 140 and the IC chip 130, the resistance Ra and Rc may be adjusted in addition to adjusting the inductance L1, the capacitance Ca, and the capacitance Cc.

Figure 8A:
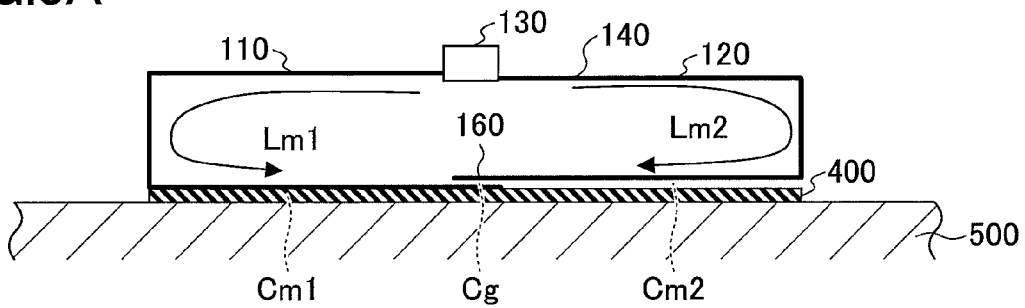
FIGS. 8A and 8B are diagrams illustrating change in electrical characteristics of a loop antenna 140 of the RFID tag 100 of the first embodiment that is attached to a metallic member 500.
Figure 8B:
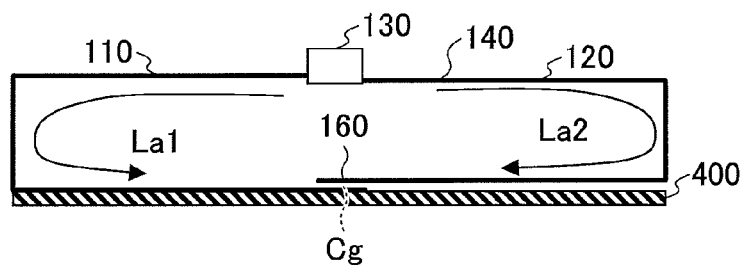
Figure 9:
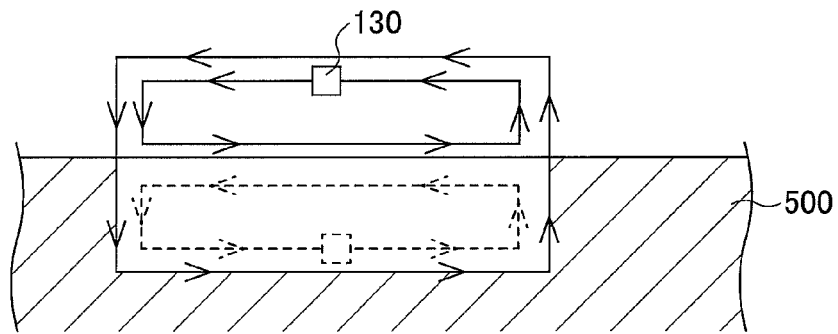
FIG. 9 is a diagram illustrating mirror imaging electric current that flows through the metallic member 500 to which the RFID tag 100 of the first embodiment is attached.
Figure 10:
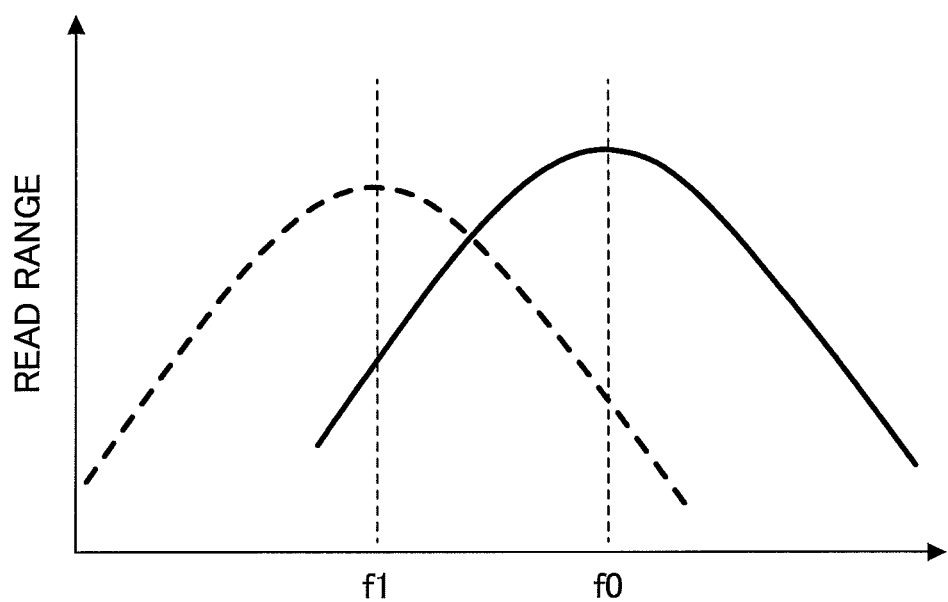
FIG. 10 is a graph illustrating respective resonant frequencies of the RFID tag 100 of the first embodiment that is attached to the metallic member 500, and the RFID tag 100 of the first embodiment that is not attached to the metallic member 500.

FIGS. 8A and 8B are diagrams illustrating change in electrical characteristics of the loop antenna 140 of the RFID tag 100 of the first embodiment that is attached to a metallic member 500. FIG. 9 is a diagram illustrating mirror imaging electric current that flows through the metallic member 500 to which the RFID tag 100 of the first embodiment is attached. FIG. 10 is a graph illustrating respective resonant frequencies of the RFID tag 100 of the first embodiment that is attached to the metallic member 500, and the RFID tag 100 of the first embodiment that is not attached to the metallic member 500.

The following describes an event that may occur when the capacitance of the overlapping part 160 has not been optimized. Note that the following description omits the interdigital part 170 in order to focus more on the change in the capacitance of the loop antenna 140 at the bottom face of the base part 101 (see FIGS. 1 to 1C).

As illustrated in FIG. 8A, the capacitances Cm1 and Cm2 are generated between the loop antenna 140 and the metallic member 500 at the bottom face of the loop antenna 140 of the RFID tag 100 that is attached to the metallic member 500 with an adhesive sheet 400 made of an insulating material. The capacitance Cg of the overlapping part 160 is also generated at the bottom face of the loop antenna 140. The inductance of the antenna elements 110 and 120 in this configuration may be represented by Lm1 and Lm2.

As illustrated in FIG. 8B, air is present at the bottom face of the RFID tag 100 that is not attached to the metallic member 500. Note that FIG. 8B illustrates the RFID tag 100 having the bottom face to which the adhesive sheet 400 is attached.

In this configuration, only the capacitance Cg of the overlapping part 160 is generated at the bottom face of the loop antenna 140. The inductance of the antenna elements 110 and 120 in this configuration may be represented by La1 and La2.

When the electric current flows, as illustrated by solid-line arrows in FIG. 9, through the loop antenna 140 of the RFID tag attached to the metallic member 500, mirror-image electric current flows, as illustrated by broken-line arrows in FIG. 9, inside the metallic member 500.

Of the current actually flowing through the loop antenna 140 and the mirror-image current, the current components parallel to the surface of the metallic member 500 may cancel out each other; however, the current components perpendicular to the surface of the metallic member 500 may direct at same directions.

Since the loop antenna 140 has a loop disposed perpendicular to the surface attached to the metallic member 500, the loop antenna 140 attached to the metallic member 500 may be able to acquire a larger current loop. The electric current distribution and values of the loop antenna 140 that is attached to the metallic member 500 may be changed compared to those of the loop antenna 140 that is not attached to the metallic member 500 (see FIG. 8B).

The inductances Lm1 and Lm2 of the antenna elements 110 and 120 in FIG. 8A may thus differ from the inductances La1 and La2 of the antenna elements 110 and 120 in FIG. 8B.

As illustrated in FIG. 8A, the electric capacitances Cm1 and Cm2 are generated at the bottom face of the loop antenna 140 of the RFID tag 100 that is attached to the metallic member 500. The presence of the capacitances Cm1 and Cm2 equates with the capacitors having the capacitances Cm1 and Cm2 being connected in parallel to the loop antenna 140.

Since the RFID tag 100 that is attached to the metallic member 500 (see FIG. 8A) has the inductance and the capacitance of the loop 140 differing from those of the RFID tag 100 that is not attached to the metallic member 500 (see FIG. 8B), the RFID tag 100 that is attached to the metallic member 500 has the resonant frequency differing form that of the RFID tag 100 that is not attached to the metallic member 500.

As illustrated in FIG. 10, f0 represents the resonant frequency of the RFID tag 100 that is attached to the metallic member 500, and f1 represents the resonant frequency of the RFID tag 100 that is not attached to the metallic member 500.

The resonant frequency of the RFID tag 100 tends to be higher when the RFID tag 100 is attached to the metallic member 500 to generate the capacitances Cm1 and Cm2 at the bottom face of the loop antenna 140. That is, f1<f0 is established. This may be clear from the above formula (1).

The resonant frequency of the RFID tag 100 that is attached to the metallic member 500 as illustrated in FIG. 8A may be affected merely a little for the following reason. The loop antenna 140 of the RFID tag 100 that is attached to the metallic member 500 additionally has the capacitances Cm1 and Cm2, and changing the capacitance Cg of the overlapping part 160 alone will not substantially affect the resonant frequency of the RFID tag 100. The capacitance of the overlapping part 160 may be changed by changing the length of an overlapping part in the X-axis direction between the end part 110B of the antenna element 110 and the end part 120B of the antenna element 120 (see FIGS. 3A to 3C).

The resonant frequency of the RFID tag 100 that is not attached to the metallic member 500 as illustrated in FIG. 8B may be greatly affected for the following reason. The loop antenna 140 of the RFID tag 100 that is not attached to the metallic member 500 has the capacitance Cg alone at the bottom face of the loop antenna 140, and changing the capacitance Cg of the overlapping part 160 will substantially affect the resonant frequency of the RFID tag 100.

The change in the capacitance Cg of the overlapping part 160 at the bottom face of the RFID tag 100 may affect relatively small the resonant frequency of the RFID tag 100 that is attached to the metallic member 500. On the other hand, the change in the capacitance Cg of the overlapping part 160 at the bottom face of the RFID tag 100 may substantially affect the resonant frequency of the RFID tag 100 that is not attached to the metallic member 500.

The RFID tag 100 of the first embodiment may optimize the capacitance of the overlapping part 160 to match the resonant frequency of the RFID tag 100 that is attached to the metallic member 500 and the resonant frequency of the RFID tag 100 that is not attached to the metallic member 500.

The RFID tags 100 that perform communications at resonant frequencies may have longest communications distance ranges.

Matching the resonant frequency for the RFID tag 100 attached to the metallic member 500 and the resonant frequency for the RFID tag 100 without being attached to the metallic member 500 will thus make both the communications distance ranges of the RFID tag 100 attached to the metallic member 500 and the RFID tag 100 without being attached to the metallic member 500 have longest possible communication distances.

The above-described configuration may enable both the RFID tag 100 attached to the metallic member 500 and the RFID tag 100 without being attached to the metallic member 500 to perform communications stably.

One of the components of changing phases in AC (alternating-current) circuits may be a susceptance, the imaginary part of admittance. The RFID tag 100 is an AC circuit in which alternating current flows through the loop antenna 140 at the resonant frequency. Matching the susceptance in the RFID tag 100 attached to the metallic member 500 and the susceptance in the RFID tag 100 without being attached to the metallic member 500 will make the resonance frequency of the RFID tag 100 attached to the metallic member 500 equal to the resonance frequency of the RFID tag 100 without being attached to the metallic member 500.

The RFID tag 100 of the first embodiment thus optimizes the capacitance of the overlapping part 160 to match the susceptance in the RFID tag 100 attached to the metallic member 500 and the susceptance in the RFID tag 100 without being attached to the metallic member 500.

The following example optimizes the capacitance of the overlapping part 160 by controlling the adjusting parts 115 of the overlapping part 160 (see FIGS. 3A to 3C).

In the following example, the admittance of the loop antenna 140 indicates the admittance of the loop antenna 140 viewing from the terminal 113 and the terminal 123A. The susceptance of the loop antenna 140 indicates the susceptance included as the imaginary component in the admittance of the loop antenna 140 viewing from the terminal 113 and the terminal 123A.

Since the admittance is a reciprocal of impedance, a susceptance may be treated as an imaginary component of impedance.

The susceptance of the loop antenna 140 in the RFID tag 100 attached to the metallic member 500 is an example of the imaginary component of a first synthetic impedance. The susceptance of the loop antenna 140 in the RFID tag 100 without being attached to the metallic member 500 is an example of the imaginary component of a second synthetic impedance.

The first synthetic impedance is obtained by the inductance of the loop antenna 140 in the RFID tag 100 attached to the metallic member 500, the capacitance between the loop antenna 140 and the metallic member 500, and the capacitance of the overlapping part 160.

The second synthetic impedance is obtained by the inductance of the loop antenna 140 in the RFID tag 100 attached to a non-metallic member, and the capacitance of the overlapping part 160.

The RFID tag 100 of the first embodiment includes the interdigital part 170 in the loop antenna 140, and hence the first synthetic impedance and the second synthetic impedance may both further include the capacitance of the interdigital part 170.

Note that the RFID tag without being attached to the metallic member 500 indicates the same RFID tag 100 attached to the non-metallic member.

The following describes optimization of the capacitance of the overlapping part 160 obtained by changing a distance D between the two adjusting parts 115 (see FIG. 3C) with reference to FIGS. 11A to 14.

Figure 11A:
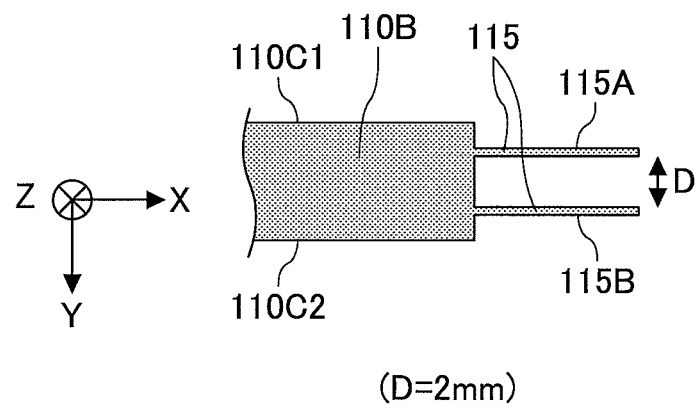
FIGS. 11A, 11B, and 11C are diagrams illustrating a technique of adjusting a distance D between two adjusting parts 115.
Figure 11B:
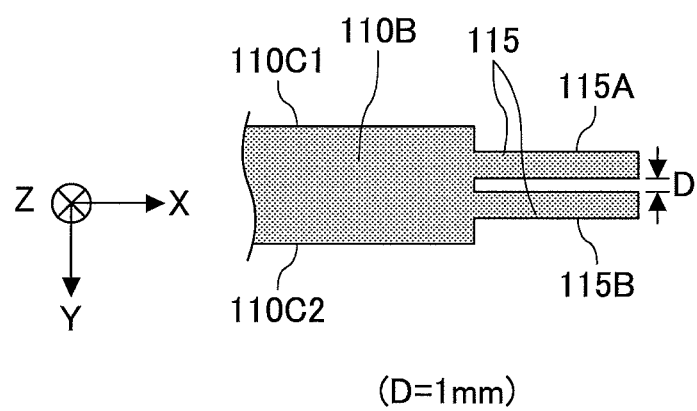
Figure 11C:
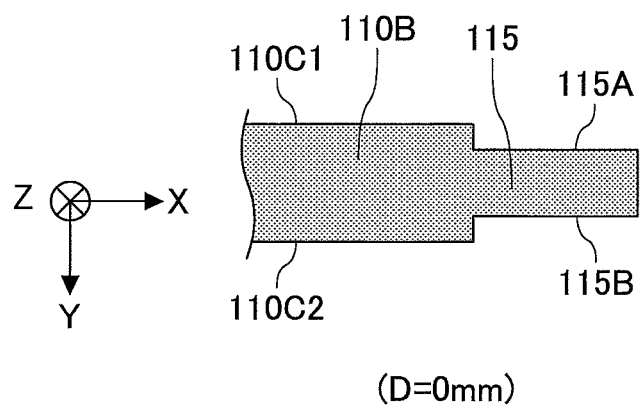

FIGS. 11A, 11B, and 11C are diagrams illustrating a technique of adjusting a distance D between two adjusting parts 115.

The distance D between the adjusting parts 115 is obtained by securing a position of the edge 115A of the adjusting part 115 disposed at the negative Y axis side and a position of the edge 115A of the adjusting part 115 disposed at the positive Y axis side, and subsequently changing the respective widths of the two adjusting parts 115. Note that the distance between the edge 115A and the edge 115B in the Y-axis direction may be 3 mm.

FIG. 11A illustrates a configuration in which a distance D=2 mm between the adjusting parts 115. FIG. 11B illustrates a configuration in which a distance D=1 mm between the adjusting parts 115. FIG. 11C illustrates a configuration in which a distance D=0 mm between the adjusting parts 115. The configuration in which the distance D=0 mm between the adjusting parts 115 indicates a unified adjusting part 115 obtained by merging the two adjusting parts 115.

Although not illustrated in FIGS. 11A to 11C, the distance between the edge 115A and the edge 115B in the Y-axis direction is 3 mm, and the configuration in which the distance D=3 mm between the adjusting parts 115 indicates that there are no adjusting parts 115.

Figure 12:
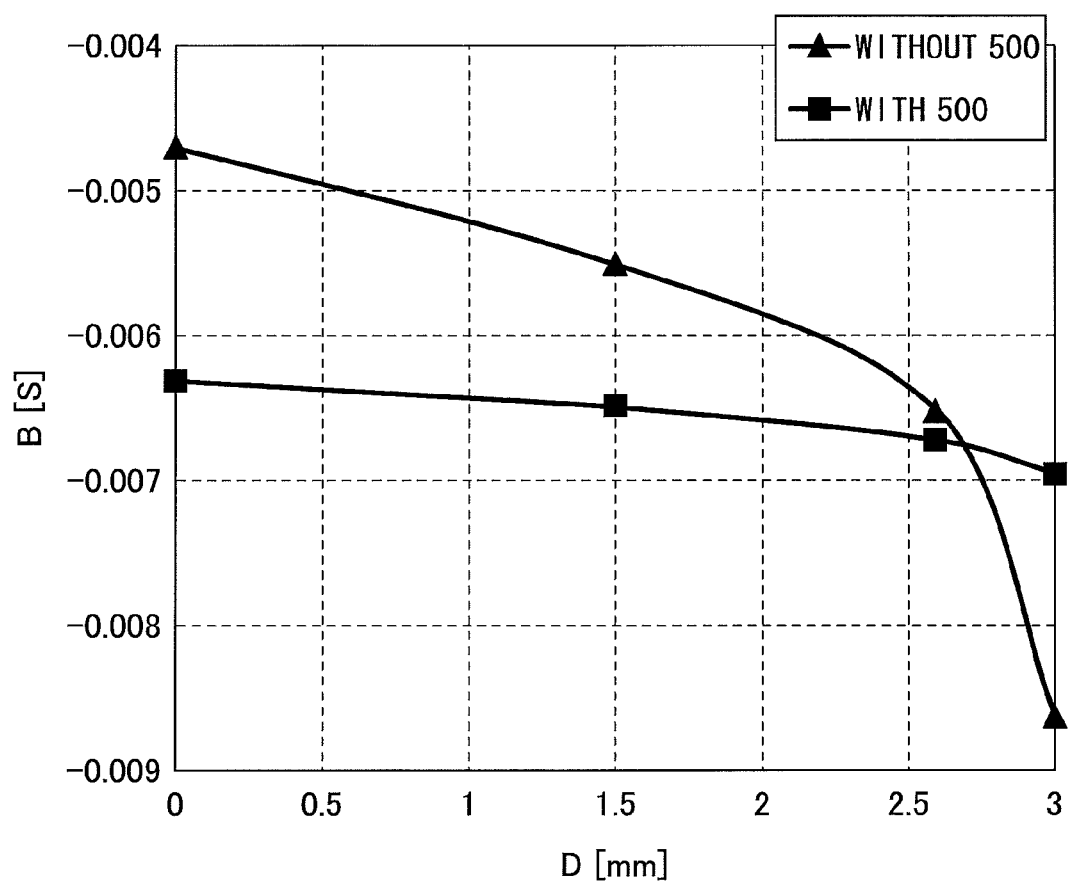
FIG. 12 is a graph illustrating characteristics of a susceptance B with respect to the distance D between the adjusting parts 115.
Figure 13:
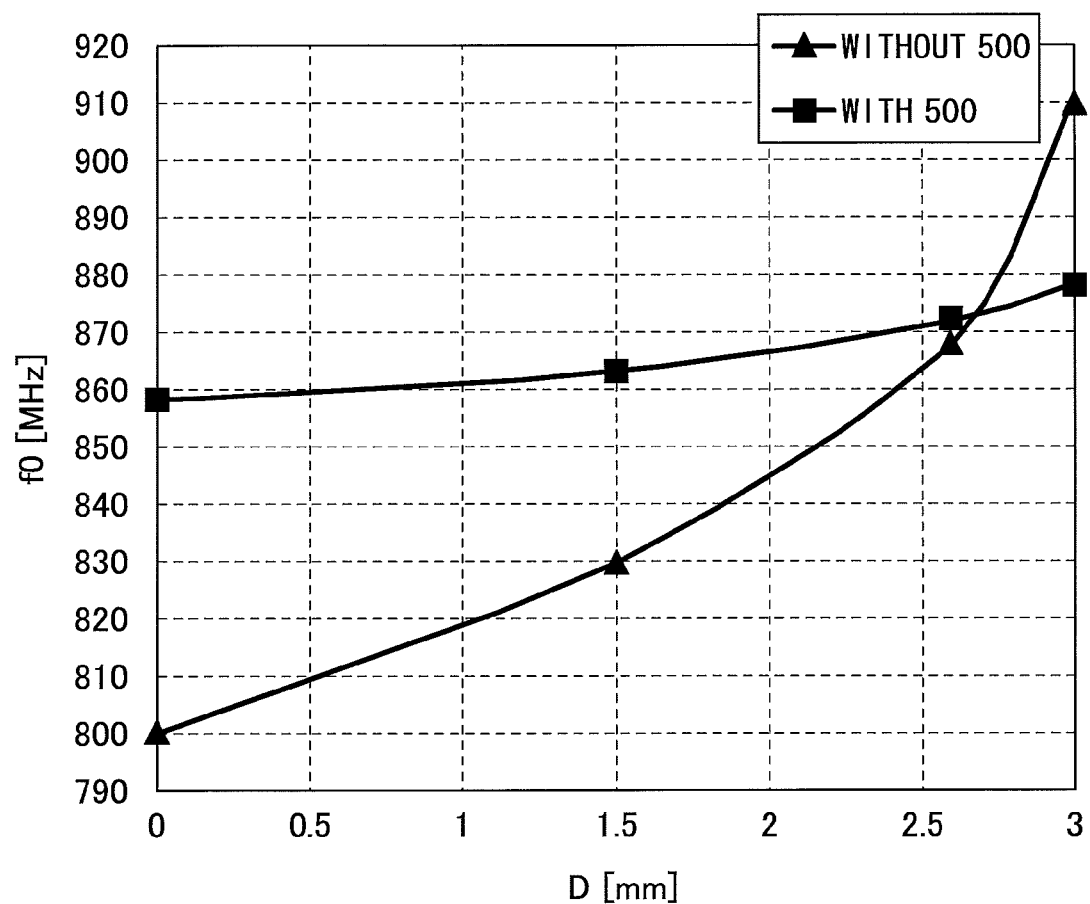
FIG. 13 is a graph illustrating characteristics of resonant frequencies with respect to the distance D between the adjusting parts 115.
Figure 14:
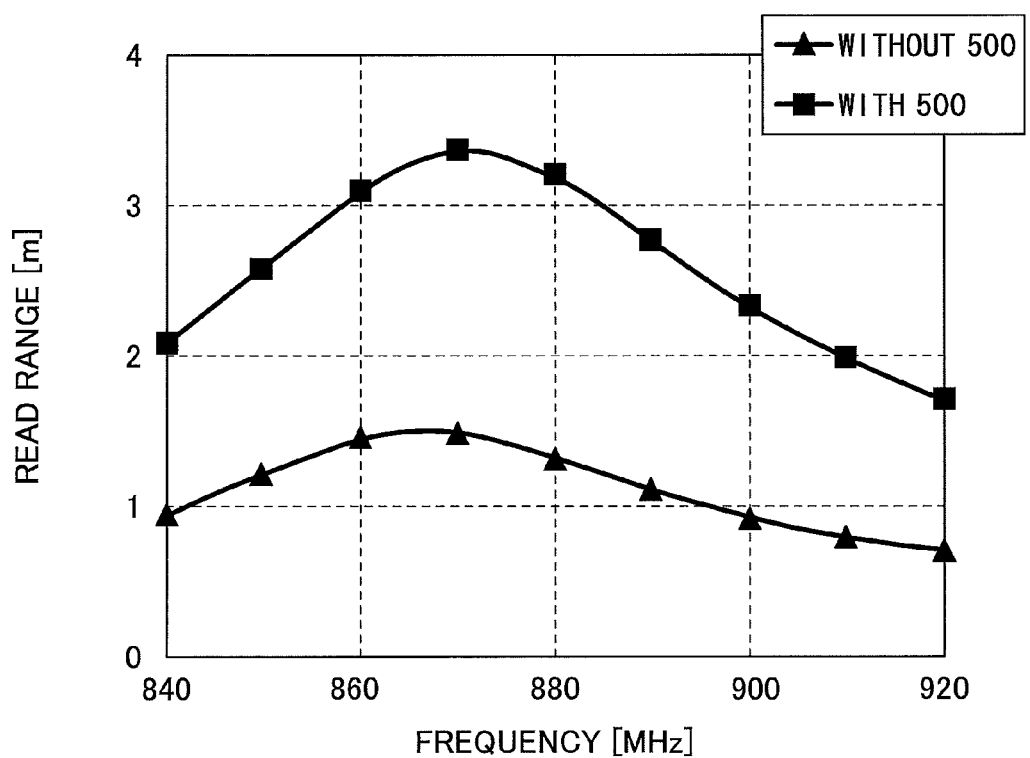
FIG. 14 is a graph illustrating characteristics of a readable distance range (Read Range) of the RFID tag 100 with respect to frequencies of reading signals.

FIGS. 12 to 14 depict simulation results obtained by adjusting the distance D between the adjusting parts 115.

FIG. 12 is a graph illustrating characteristics of the susceptance B with respect to the distance D between the adjusting parts 115. FIG. 13 is a graph illustrating characteristics of the resonant frequencies with respect to the distance D between the adjusting parts 115. FIG. 14 is a graph illustrating characteristics of a readable distance range (Read Range) of the RFID tag 100 with respect to the frequencies of reading signals. FIGS. 12 to 14 illustrate the characteristics obtained by an electromagnetic field simulator.

In FIGS. 12 to 14, square plotting points represent the characteristics of the resonant frequency of the RFID tag 100 attached to the metallic member 500, and triangular plotting points represent the characteristics of the resonant frequency of the RFID tag 100 without being attached to the metallic member 500.

As illustrated in FIG. 12, adjusting the distance D between the adjusting parts 115 to be approximately 2.7 mm has matched the susceptance in the RFID tag 100 attached to the metallic member 500 and the susceptance in the RFID tag 100 without being attached to the metallic member 500.

Similarly, adjusting the distance D between the adjusting parts 115 to be approximately 2.7 mm has matched the resonance frequency in the RFID tag 100 attached to the metallic member 500 and the resonance frequency in the RFID tag 100 without being attached to the metallic member 500. The matched resonant frequency is approximately 870 MHz, and may further be finely adjusted to 865 MHz.

As illustrated in FIG. 14, both the characteristics of the RFID tag 100 attached to the metallic member 500 and the RFID tag 100 without being attached to the metallic member 500 have reached their respective peaks at the resonant frequency of approximately 865 MHz by changing the frequencies of the reading signals between the RFID tag 100 attached to the metallic member 500 and the RFID tag 100 without being attached to the metallic member 500 with the distance D between the adjusting parts 115 being secured to 2.7 mm.

Note that the readable distance of the RFID tag 100 attached to the metallic member 500 differs from the readable distance of the RFID tag 100 without being attached to the metallic member 500 as illustrated in FIG. 14 because the mirror imaging electric current may increase the appearance loop of the RFID tag 100 attached to the metallic member 500.

The above-described configuration enables the RFID tag 100 of the first embodiment to optimize the capacitance of the overlapping part 160, thereby matching the resonant frequency of the RFID tag 100 that is attached to the metallic member 500 and the resonant frequency of the RFID tag 100 that is not attached to the metallic member 500.

As described above, matching the susceptance of the RFID tag 100 attached to the metallic member 500 and the susceptance of the RFID tag 100 without being attached to the metallic member 500 implements optimization of the capacitance of the overlapping part 160.

The communications distance range of the RFID tag 100 that performs communications at the resonant frequency will be longest. Hence, matching the resonant frequency of the RFID tag 100 that is attached to the metallic member 500 and the resonant frequency of the RFID tag 100 that is not attached to the metallic member 500 may acquire the longest communications distance range as illustrated in FIG. 14.

The first embodiment may provide the RFID tag 100 capable of performing communications stably regardless of the RFID tag 100 attached to the metallic member 500 or the RFID tag 100 without being attached to the metallic member 500 by matching the susceptance of the RFID tag 100 attached to the metallic member 500 and the susceptance of the RFID tag 100 without being attached to the metallic member 500.

Note that an electromagnetic field simulator enables calculation of the distance D between the adjusting parts 115 for matching the susceptance of the RFID tag 100 attached to the metallic member 500 and the susceptance of the RFID tag 100 without being attached to the metallic member 500. This result is illustrated in FIGS. 12 to 14.

Specifying conditions, such as materials, dielectric constants, and conductivities of the antenna elements 110 and 120, and dimensions of the parts in the electromagnetic field simulator enables the electromagnetic field simulator to calculate the distance D between the adjusting parts 115 for matching the susceptance of the RFID tag 100 attached to the metallic member 500 and the susceptance of the RFID tag 100 without being attached to the metallic member 500.

The above-described configuration illustrates an aspect of embodiments to calculate the distance D between the adjusting parts 115 for matching the susceptance of the RFID tag 100 attached to the metallic member 500 and the susceptance of the RFID tag 100 without being attached to the metallic member 500.

However, the susceptance of the RFID tag 100 attached to the metallic member 500 does not necessarily match the susceptance of the RFID tag 100 without being attached to the metallic member 500. Mean frequencies at which the characteristics of both the RFID tag 100 attached to the metallic member 500 and the RFID tag 100 without being attached to the metallic member 500 achieve the peaks illustrated in FIG. 14 may be slightly offset from each other. The distance D between the adjusting parts 115 may be controlled to allow the mean frequencies at which the characteristics of both cases reach the peaks to fall within a range of ±10%.

In such a case, the distance D between the adjusting members 115 may be controlled to allow the difference between the susceptance of the RFID tag 100 attached to the metallic member 500 and the susceptance of the RFID tag 100 without being attached to the metallic member 500 to fall within a predetermined range.

The above-described configuration illustrates an aspect of the embodiments having the adjusting parts 115 on the end part 110B of the antenna element 10. The adjusting parts 115 correspond to a part of the overlapping part 160.

The adjusting parts 115 are not necessarily disposed in the RFID tags 100 having a configuration capable of acquiring a desired resonant frequency without having adjusting parts 115.

The above-described configuration illustrates an aspect of the embodiments having the adjusting parts 115 formed of two long thin patterns. Thicknesses of the two adjusting parts 115 may be changed to those illustrated in FIG. 11B. Alternatively, the two adjusting parts 115 may be merged into one as illustrated in FIG. 11C.

The following describes an RFID system having the RFID tag 100.

Figure 15:
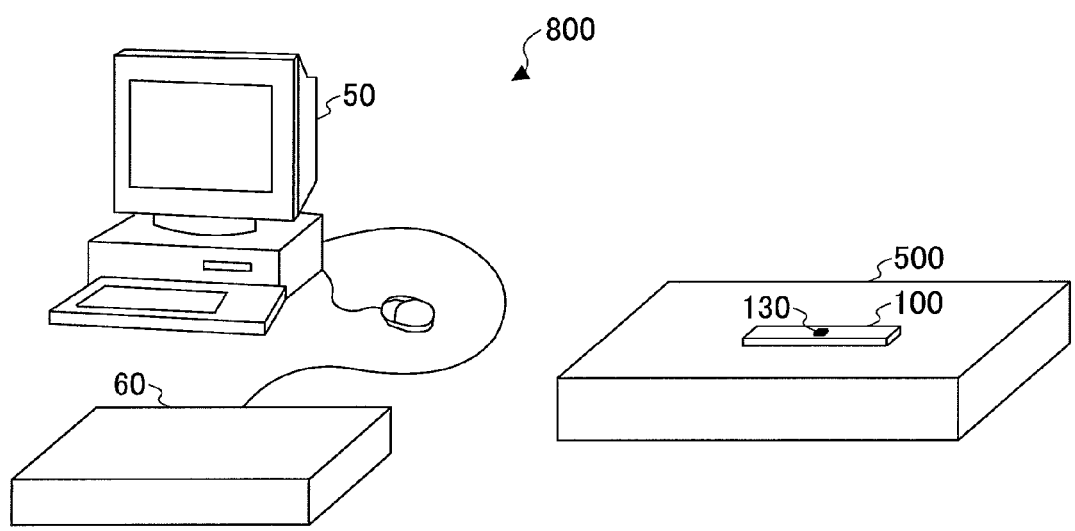
FIG. 15 is a diagram illustrating an RFID system 800 employing the RFID tag 100 of the first embodiment.

FIG. 15 is a diagram illustrating an RFID system 800 employing the RFID tag 100 of the first embodiment.

The RFID system 800 may include an RFID tag 100, a personal computer (PC) 50, and a reader-writer 60. In FIG. 15, the RFID tag 100 is attached to a metallic member 500. Note that illustration of the loop antenna 140 of the RFID tag 100 (see FIGS. 1A to 1C) is omitted from FIG. 15.

The reader-writer 60 is connected to the PC 50. The reader-writer 60 that has received an instruction signals from the PC 50 transmits a reading signal. The reader-writer 60 further receives a signal representing the ID transmitted from the RFID tag 100. This enables the PC 50 to identify the ID of the RFID tag 100.

Note that the configuration illustrated above describes an aspect of the embodiments having the reader-writer 60 connected to the PC 50. However, the reader-writer 60 may be connected to a server.

The RFID tag 100 of the first embodiment may optimize the capacitance of the overlapping part 160 to match the resonant frequency of the RFID tag 100 that is attached to the metallic member 500 and the resonant frequency of the RFID tag 100 that is not attached to the metallic member 500.

The RFID tag 100 attached to the metallic member 500 as illustrated in FIG. 15 and the RFID tag 100 attached to a non-metallic member may both be able to acquire the longest communications distance range.

The above-described configuration may enable the RFID system 800 to perform communications stably regardless of having the RFID tag 100 attached to the metallic member 500 or having the RFID tag 100 without being attached to the metallic member 500.

Second Embodiment

Figure 16:
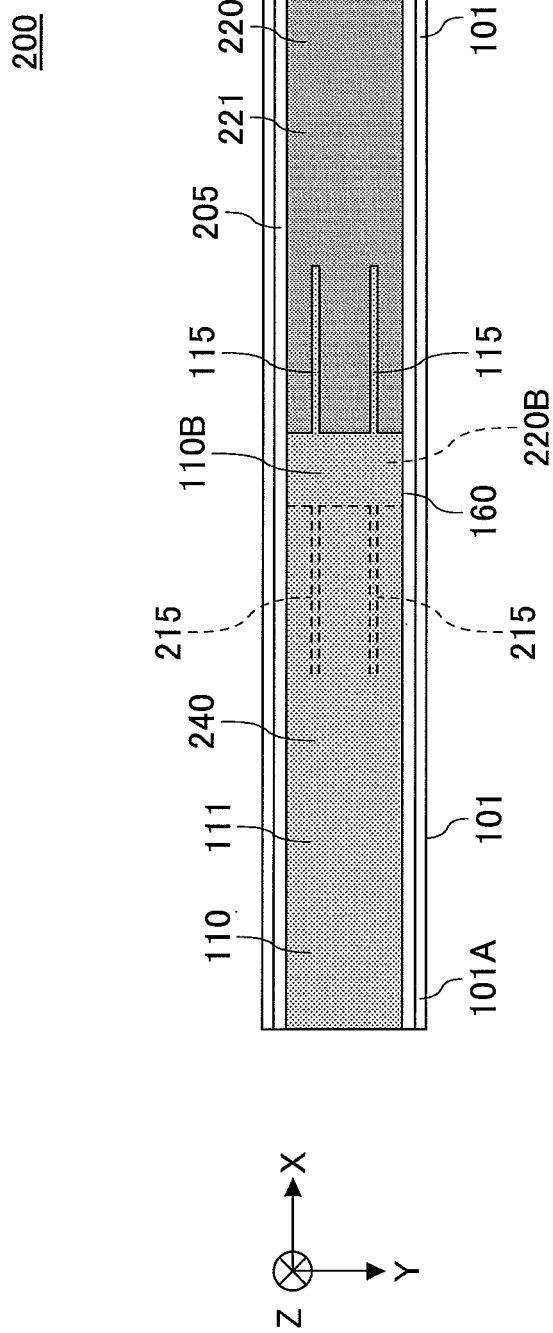
FIG. 16 is a diagram illustrating an RFID tag 200 of a second embodiment.
Figures 17A, 17B:
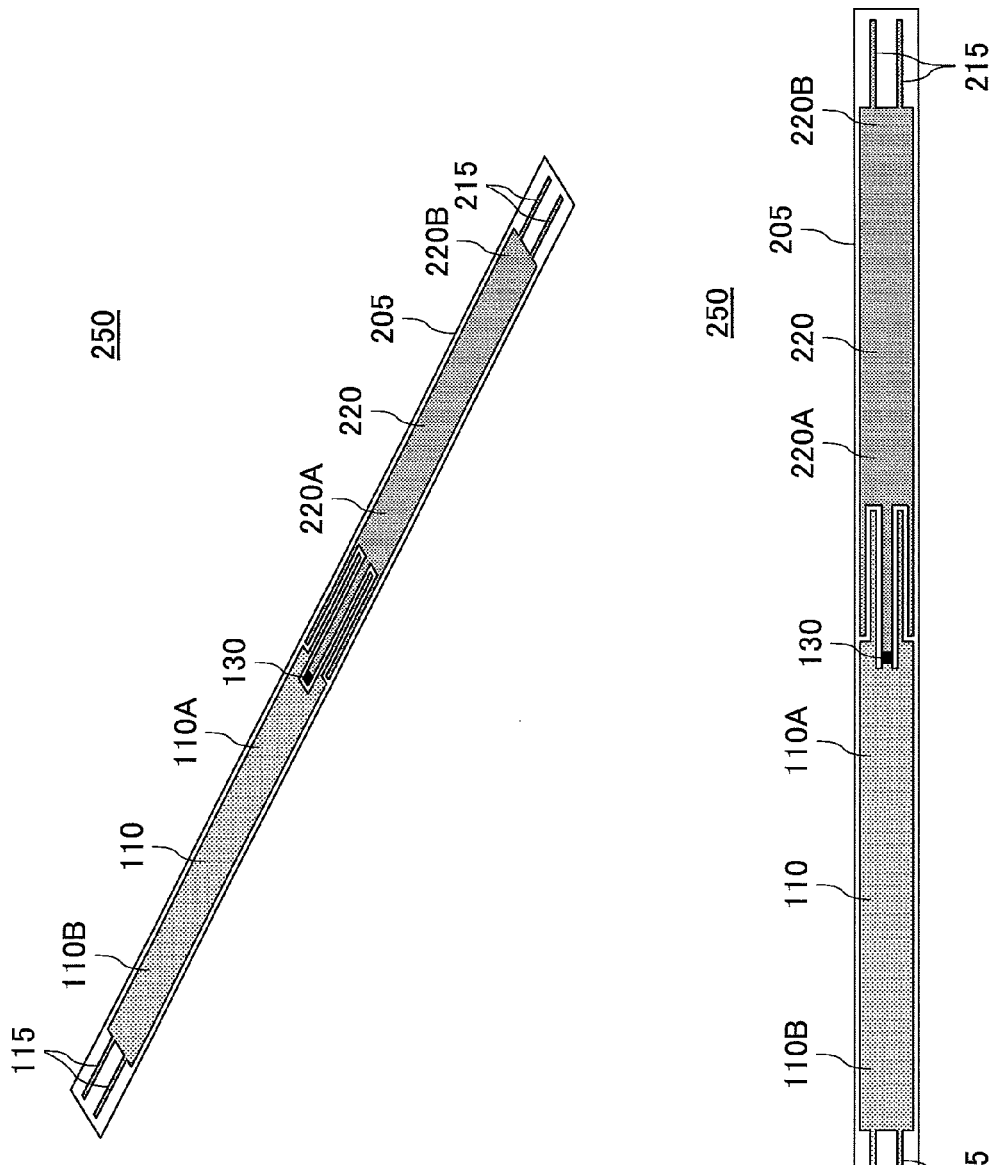
FIGS. 17A and 17B are diagrams illustrating an inlay 250 included in the RFID tag 200 of the second embodiment.

FIG. 16 is a diagram illustrating an RFID tag 200 of a second embodiment. FIGS. 17A and 17B are diagrams illustrating an inlay 250 included in the RFID tag 200 of the second embodiment.

The RFID tag 200 of the second embodiment includes a base part 101, a sheet part 205, antenna elements 110 and 220, and an IC chip 130. Of these elements, the sheet part 205, the antenna elements 110 and 120 and the IC chip 130 constitute an inlay 250.

The RFID tag 200 of the second embodiment includes a configuration in which the adjusting parts 215 are connected to the end part 120B of the antenna element 120 (see FIGS. 3A to 3C) of the RFID tag 100 of the first embodiment. The RFID tag 200 of the second embodiment includes a configuration in which the adjusting parts 215 are connected to the end part 120B of the antenna element 120 (see FIGS. 3A to 3C) of the RFID tag 100 of the first embodiment. The adjusting parts 215 are an example of a second projection part.

The adjusting parts 215 are connected to an end part 220B of the antenna element 220. The configurations of the adjusting parts 215 are similar to those of the adjusting parts 115.

The RFID tag 200 of the second embodiment includes the sheet part 205 having a length longer than the length of the sheet part 205 of the first embodiment.

The RFID tag 200 of the second embodiment further includes the antenna elements 110 and 220 forming a loop antenna 240.

Since other elements of the RFID tag 200 of the second embodiment are the same as or equivalent to those of the RFID tag 100 of the first embodiment, those elements of the RFID tag 200 of the second embodiment that are the same as or equivalent to those of the RFID tag 100 of the first embodiment are designated by the same reference numerals, and a duplicated description is omitted.

The second embodiment may provide the RFID tag 200 capable of performing communications stably regardless of the RFID tag 200 attached to the metallic member 500 or the RFID tag 200 without being attached to the metallic member 500 by matching the susceptance of the RFID tag 200 attached to the metallic member 500 and the susceptance of the RFID tag 200 without being attached to the metallic member 500.

Since the RFID tag 200 of the second embodiment includes the adjusting parts 215, a range of the resonance frequency within which the RFID tag 200 attached to the metallic member 500 and the RFID tag 200 without being attached to the metallic member 500 are adjusted may be increased.

The exemplified RFID tag of the above-described embodiments are described above; however, these examples are not limited to those specifically disclosed as the above-described embodiments. Various modifications or alterations may be made without departing from the scope of claims.

According to an aspect of the above-described embodiments, there is provided an RFID tag and an RFID system capable of performing communications stably regardless of the RFID tag being attached to a metallic member or a non-metallic member.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present disclosure have been described in detail, it should be understood that various changes, substitutions, and alterations could be made hereto without departing from the spirit and scope of the invention.

What is claimed is:

1. An RFID tag comprising:
a base part made of dielectric material and having plate-like shape;
a loop antenna formed around the base part, the loop antenna including a first antenna element and a second antenna element, the loop antenna having a loop-length shorter than a wavelength of a resonant frequency; and
an IC chip placed at a first surface side of the base part, the IC chip being connected between a first terminal disposed on a first end of the first antenna element and a second terminal disposed on a first end of the second antenna element,
wherein the loop antenna includes an overlapping part placed at a second surface side of the base part, a first end part disposed on a second end of the first antenna element and a second end part disposed on a second end of the second antenna element being overlapped at the overlapping part, the first end part and the second end part being insulated from each other,
wherein a capacitance of the overlapping part is adjusted such that a difference between an imaginary component of a first synthetic impedance and an imaginary component of a second synthetic impedance is less than or equal to a predetermined value, the imaginary component of the first synthetic impedance viewed from the first terminal and the second terminal being obtained based on an inductance of the loop antenna in a case where the second surface side of the base part is attached to a metallic member, a capacitance obtained between the loop antenna and the metallic member and the capacitance of the overlapping part, the imaginary component of the second synthetic impedance viewed from the first terminal and the second terminal being obtained based on an inductance of the loop antenna in a case where the second surface side of the base part is attached to a non-metallic member and the capacitance of the overlapping part.

2. The RFID tag as claimed in claim 1, wherein the capacitance of the overlapping part is adjusted to match the imaginary component of the first synthetic impedance and the imaginary component of the second synthetic impedance.

3. The RFID tag as claimed in claim 1, further comprising:
a sheet member on which the first antenna element and the second antenna element of the loop antenna are formed, wherein the sheet member is wrapped around the base part to form the loop antenna around the base part.

4. The RFID tag as claimed in claim 3, wherein the first antenna element, the second antenna element, and the sheet member constitute an inlay.

5. The RFID tag as claimed in claim 1, wherein the first antenna element has a width narrower than a width of the first end part, and includes a first projection part projecting from the first end part in a longitudinal direction of the loop antenna.

6. The RFID tag as claimed in claim 5, wherein the first projection part is offset from the first end part toward a central part in a width direction of the first end part.

7. The RFID tag as claimed in claim 5, wherein the first antenna element has two first projection parts.

8. The RFID tag as claimed in claim 1, wherein the second antenna element has a width narrower than a width of the second end part, and includes a second projection part projecting from the second end part in a longitudinal direction of the loop antenna.

9. The RFID tag as claimed in claim 8, wherein the second projection part is offset from the first end part toward a central part in a width direction of the second end part.

10. The RFID tag as claimed in claim 8, wherein the second antenna element has two second projection parts.

11. The RFID tag as claimed in claim 1, wherein one of the first end of the first antenna element and the first end of the second antenna element overlaps one of the first end part and the second end part in a plan view.

12. The RFID tag as claimed in claim 1, wherein the loop antenna includes an interdigital part disposed at the first end of the first antenna element and at the first end of the second antenna element.

13. An RFID system comprising:
an RFID tag; and
a reader-writer configured to perform communications with the RFID tag, wherein
the RFID tag includes
a base part made of dielectric material and having plate-like shape;
a loop antenna formed around the base part, the loop antenna including a first antenna element and a second antenna element, the loop antenna having a loop-length shorter than a wavelength of a resonant frequency; and
an IC chip placed at a first surface side of the base part, the IC chip being connected between a first terminal disposed on a first end of the first antenna element and a second terminal disposed on a first end of the second antenna element,
wherein the loop antenna includes an overlapping part placed at a second surface side of the base part, a first end part disposed on a second end of the first antenna element and a second end part disposed on a second end of the second antenna element being overlapped at the overlapping part, the first end part and the second end part being insulated from each other, wherein
a capacitance of the overlapping part is adjusted such that a difference between an imaginary component of a first synthetic impedance and an imaginary component of a second synthetic impedance is less than or equal to a predetermined value, the imaginary component of the first synthetic impedance viewed from the first terminal and the second terminal being obtained based on an inductance of the loop antenna in a case where the second surface side of the base part is attached to a metallic member, a capacitance obtained between the loop antenna and the metallic member and the capacitance of the overlapping part, the imaginary component of the second synthetic impedance viewed from the first terminal and the second terminal being obtained based on an inductance of the loop antenna in a case where the second surface side of the base part is attached to a non-metallic member and the capacitance of the overlapping part.

* * * * *